United States Patent [19]

Eversteijn et al.

[11] 3,816,166

[45] June 11, 1974

[54] VAPOR DEPOSITING METHOD

[75] Inventors: Franciscus Cornelis Eversteijn; Hermanus Leonardus Peek, both of Emmasingel, Eindhoven, Netherlands

[73] Assignee: U.S. Philips Corporation, New York, N.Y.

[22] Filed: May 16, 1973

[21] Appl. No.: 360,670

Related U.S. Application Data

[62] Division of Ser. No. 120,983, March 4, 1971, Pat. No. 3,750,620.

[30] Foreign Application Priority Data

Mar. 11, 1970 Netherlands ....................... 7003431

[52] U.S. Cl. .............................................. 117/106 A

[51] Int. Cl. .............................................. C23c 11/06

[58] Field of Search ......................... 117/106–107.2; 118/48–49.5; 148/174, 175

[56] References Cited

UNITED STATES PATENTS

| | | | |
|---|---|---|---|
| 3,367,304 | 2/1968 | Robbins | 118/49.5 |
| 3,484,311 | 12/1969 | Benzing | 148/175 X |
| 3,511,727 | 5/1970 | Hays | 148/175 X |

*Primary Examiner*—Morris Kaplan
*Attorney, Agent, or Firm*—Norman N. Spain; Frank R. Trifari

[57] ABSTRACT

In a method of semiconductor manufacture wherein a semiconductor substrate is supported on a susceptor and subjected to a vapor stream wherein are maintained predetermined conditions of stream rate, pressure and temperature and of decreasing reactor height.

3 Claims, 2 Drawing Figures

VAPOR DEPOSITING METHOD

This is a division, of application Ser. No. 120,983, filed Mar. 4, 1971, now U.S. Pat. No. 3,750,620.

The invention relates to a process involving a stream of gas and at least one substrate, and a reactor comprising an elongated tube and being provided with a device for heating the substrate through a susceptor having a temperature exceeding the ambient temperature and with members for passing a stream of gas in the direction of length of the tube.

Such a reactor is known, for example, from semiconductor manufacture, where it may be employed for carrying out processes such as the deposition of a semiconductor material from a gas stream on a semiconductor substrate in single- or polycrystal form, for etching semiconductor substrates by a gaseous etchant or for converting a semiconductor surface into a nitride or an oxide with the aid of a gas stream.

When such a reactor is used, the susceptor operates as a heat source for the substrate and over a heat source outside the tube it has the advantage that the tube is at a lower temperature and may even be cooled so that unwanted depositions on the tube wall can be avoided and the desired processes are performed on or near the substrate.

Such a reactor is described, for example, in an article of E. F. Cave and B. R. Czorny in R.C.A. Review Vol. 24, pages 523 to 545 (1963).

This reactor comprises an elongated, horizontal tube provided with a device comprising a high-frequency inductance coil for heating a susceptor of a material suitable for induction heating, on which single-crystal substrates of semiconductor material are disposed. The substrates are heated in a stream of gas. The tube is provided with connections for passing the flow of gas in the direction of length of the reactor. By chemical reaction semiconductor material is deposited on the substrates from the stream of gas in epitaxial manner.

In known reactors material is deposited in a tube portion having a constant diameter. Such reactors have the disadvantage that the material deposited from the stream of gas on the substrates often forms a layer of non-uniform thickness, which adversely affects the properties of semiconductor devices made from the substrates with the layers deposited thereon. Viewed in the direction of the stream of gas the thickness of the deposited layer decreases. This applies both to the separate substrates and to several substrates relative to each other.

It is known to improve the uniformity of the thickness of the deposited layer by arranging the substrates on a susceptor inclined to the axis of the tube (see, for example, the article of S. E. Mayer and D. E. Shea in "Journal ElectroChemical Society" Vol. 11, pages 550 to 556 (1964). The uniformity is correlated to an increasing rate of gas flow with a decreasing concentration of material to be deposited in this flow. The inclined susceptor has, however, the disadvantage that, if it does not perfectly join the tube wall, gas can escape towards the lower side of the susceptor. This drawback can be avoided only with difficulty, particularly when the deposition is performed at a high temperature, which is often the case and due to the difference between the expansion coefficients of the material of the susceptor and that of the tube the junction between the susceptor and the tube wall may be very bad at said high temperature. Moreover, at the ambient temperature an amount of play between the tube wall and the susceptor is required to allow an unhindered slip of the susceptor into and out of the tube.

Said unsatisfactory junction disturbs the flow profile above the susceptor, since gas can escape towards the lower side of the susceptor, which results in an undesirable thickness variation of the deposited layer viewed in the direction of the gas stream and at right angles thereto.

The aforesaid variations in the process on inclined and non-inclined susceptors occur not only in the deposition of material but, for example, also in the removal of material from substrates, for example, in etching with the aid of a gaseous etchant. During the etching process the substrate also exhibits an undesirable variation in thickness.

The invention has for its object inter alia to avoid the disadvantages described above.

The reactor of the kind set forth is characterized in accordance with the invention in that at least that tube portion in which the process is performed exhibits a decreasing sectional area viewed in the direction of the gas stream.

The reactor for practicing the invention has the advantage that variations in thickness of the deposited material viewed in the direction of the gas stream and at right angles thereto are reduced to a considerable extent.

The reactor for practicing the invention preferably comprises means for continuously displacing substrates through the reactor during the process.

Such means are understood to include, for example, a pushing member for continuously shifting substrates on susceptors through a horizontal tube.

A continuous operation with inclined susceptors would yield unsatisfactorily results, since the discontinuities between successive susceptors would give rise to undesirable disturbances of the flow profile.

It might be remarked that layers of uniform thickness are also obtained in a tube whose portion intended for the performance of the process has a constant diameter viewed in the direction of length, provided the process is continuous.

However, in the latter case, if, for example, semiconductor material having a given concentration of doping impurities has to be deposited on substrates the choice of the impurity is very critical, since the impurity concentration in the deposited material is frequently dependent upon the rate of deposition of the semiconductor material.

This would mean that in continuous operation of a reactor comprising a constant-diameter tube the impurity is not homogeneously distributed in the deposited layer because the rate of deposition is not constant, which often involves a disadvantage. On the contrary, in a continuous operation of a reactor comprising a tube having a sectional area tapering in the direction of the gas stream the impurity can be homogeneously distributed in the deposited layer because the rate of deposition can be kept constant. The constant rate of deposition is obtained inter alia by means of an increasing linear speed of the gas stream with a decreasing concentration of material to be deposited in this gas stream.

Continuously operating reactors provide an appreciably higher yield of substrates with deposited material than discontinuously operating reactors because heating-up of continuously operating reactors need take place only once, whereas in discontinuously operating reactors every charge requires heating and cooling.

A satisfactory control of the thickness of the deposited material is particularly obtained in a reactor embodying the invention which comprises a tube having a substantially rectangular section at right angles to the direction of length, two horizontal sides of which have a constant length, viewed in the direction of the gas stream, whereas the length of the two vertical sides decreases substantially porportionally to the length of the tube so that the prolongations of the top and bottom surfaces of the tube are at an angle $\phi$.

If silicon is deposited by thermal decomposition of silane tan $\phi$ preferably lies between 0.03 and 0.06, in the case of reduction of trichlorosilane ($SiHCl_3$) with hydrogen it preferably lies between 0.01 and 0.05 and with the reduction of silicon tetrachloride ($SiCl_4$) it lies preferably between 0.005 and 0.02.

The invention furthermore relates to a method of manufacturing a semiconductor device in which a process is employed which involves a gas stream and at least one heated substrate in a reactor embodying the invention which is characterized in that the relation:

$$1.10^{-8}<(V_o \tan^2\phi)/(T_S T_M b\ 0{,}5 D_0 1{,}5)<100.10^{-8}$$

is satisfied, wherein $V_o$ is the gas rate in cms/sec at normal temperature and pression at the inlet of the tube portion where the process takes place, $T_s$ is the temperature of the substrate in degrees Kelvin, $T_m$ is the temperature of the gas in the tube portion where the process is performed in degrees K, $b$ is the distance between the susceptor and the top surface of the reactor at the inlet of the tube portion where the process is performed in centimetres and $D_o$ is the diffusion coefficient in sq.cms/sec of the compound in the gas stream which determines the rate of the process.

If the aforesaid factors which determine to an appreciable extent the variations in thickness of the deposited material, are adjusted to each other in this manner, the process is performed uniformly.

It should be noted that the value of the diffusion coefficient used may differ from that found for the same compound in literature. This is due to the fact that $T_s$ and $T_m$ often differ considerably so that apart from diffusion under the action of a difference in concentrations also the phenomenon of thermo-diffusion occurs. For example, the value of $D_o$ for $SiH_4$ used for the deposition of silicon by thermal decomposition is 0.2 sq.cm/sec, whereas the values of $D_o$ for $SiHCl_3$ and $SiCl_4$ used for the deposition of silicon by hydrogen reduction are 0.10 sq.cm/sec and 0.04 sq.cm/sec respectively.

Said factors preferably satisfy the relatjion:

$$3{,}10^{-7}<(V_o \mathrm{Tan}^2\phi)/(T_S T_M b^{0.5} Do^{1.5})<7.10^{-7}$$

A constant concentration of a doping impurity, if any, is obtained in a preferred form of the method embodying the invention by continuously displacing the substrates through the tube during the deposition.

The invention furthermore relates to a semiconductor device manufactured by the method embodying the invention.

The method will now be described with reference to the drawing and a few examples.

EXAMPLE 1

Figure 1:
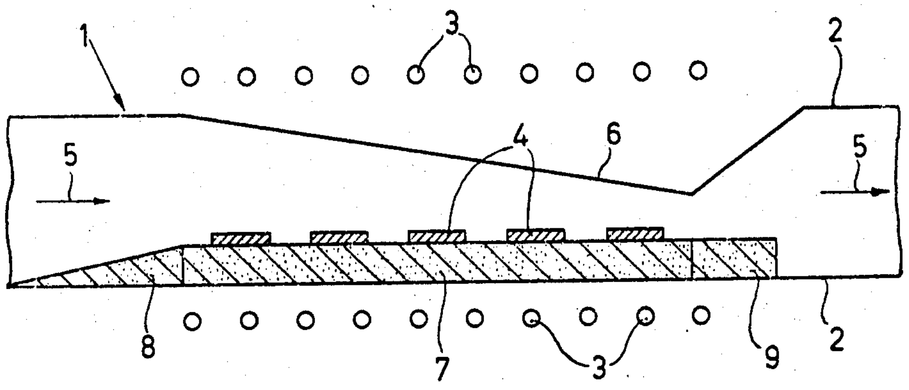
FIG. 1 is a schematic longitudinal sectional view of a first embodiment of the reactor in accordance with the invention.

FIG. 1 shows a reactor 1 for the deposition of material from a gas stream. The reactor 1 comprises an elongated tube 2 having a substantially rectangular section at right angles to the direction of length and is provided with a device formed by a high-frequency induction coil 3 for heating a plurality of substrates 4. The reactor is furthermore provided with members (not shown) intended to pass a gas stream in the direction of the arrows 5 through the tube 2. A portion 6 of the tube, where material is deposited, has a section tapering in the direction 5 of the gas stream so that, viewed in the direction of the gas stream two horizontal sides of the rectangular section have substantially constant lengths and the lengths of the two vertical sides decrease substantially proportionally to the length of the tube.

The tube 2 may be cooled by water or air.

The substrates 4 are located during the heating process on a susceptor 7, which may consist of graphite, a surface layer of which is converted, for example, in the reactor 1 by treatment in a gas stream containing suitable silicon compound into silicon carbide.

Viewed in the direction of length of the tube, the susceptor 7 is enclosed between two auxiliary pieces 8 and 9 of quartz and joins the upright walls of the tube.

The susceptor may have a length of 60 cms, a width of 10 cms and a thickness of 1 cm. Such susceptors can accommodate in the longitudinal direction 11 silicon substrates of a diameter of 5 cms and in the lateral direction 3 substrates (in total 33 substrates). A conventional thickness of such substrates is 200 to 250$\mu$um.

In a method of manufacturing a semiconductor device, in which the reactor described above is employed, silicon is epitaxially deposited, for example, from a hydrogen stream having 0.1 percent by volume of $SiH_4$. $V_o = 50$ cms/sec, tan $\phi = 0.045$, $T_s = 1{,}350$°K, $T_m = 700$°K, $b$=5 cms and $D_o = 0.20$ sq.cm/sec.

Under these conditions the relation: $(V_o \mathrm{Tan}^2\phi)/(T_s T_M b^{0.5} Do^{1.5})$ is $5.4 \cdot 10^{-7}$.

The average rate of deposition of material is 0.4$\mu$um/min. with a variation in thickness in the direction of length of the susceptor of less than about 2 percent.

A similar rate of deposition and variation in thickness are obtained in the case of a hydrogen stream containing 0.2 percent by volume of $SiHCl_3$: $V_o = 70$ cms/sec, tan $\phi$= 0.025, $T_s = 1{,}500$°K, $T_m = 900$°K, $b = 3$ cms, $D_o = 0.10$ sq.cm/sec and $(V_o \mathrm{Tan}^2\phi)/(T_S T_M b^{0.5} D_o^{1.5})$ is $6 \cdot 10^{-7}$.

EXAMPLE II

Figure 2:
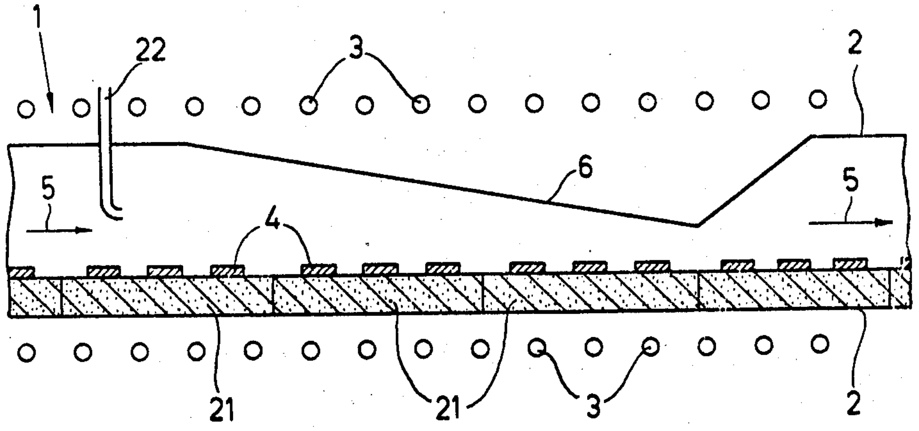
FIG. 2 is a schematic longitudinal sectional view of a second embodiment of the reactor in accordance with the invention.

FIG. 2 shows a portion of a second embodiment of the reactor 1 in accordance with the invention, which differs from the foregoing Example in that means (not shown) are provided for continuously displacing substrates 4 through the reactor 1 during the deposition of material. The closing means for the susceptor can be omitted and a plurality of susceptors 21 are shifted one after the other through the tube 2 during the deposition process.

The direction of displacement of the susceptors 21 may be equal to the direction of the gas stream or opposite thereto. The rate of passage of the susceptors will usually be low as compared with $V_o$.

The second embodiment comprises a gas inlet 22 for a component, for example, $SiCl_4$, which is active in the process to be performed.

In one form of the method embodying the invention, in which substrates are continuously passed through the tube during the deposition, the rate of passage being 2 cms/min, $V_o$ is 40 cms/sec for a hydrogen stream containing 0.3 percent by volume of $SiCl_4$, $\tan \phi = 0.015$, $T_s = 1{,}500°K$, $T_m = 900°K$, $b = 3$ cms and $D_o = 0.04$ sq.cm/sec, and the relation:

$$(V_o \tan^2\phi)/(T_S T_M\, b^{0.5} D_o^{1.5})$$

is $4.5 \cdot 10^{-7}$.

The average rate of epitaxial deposition of silicon is 0.4μm/min. If the gas stream contains a dopant, for example, in the form of the compound $PH_3$, the variation in the concentration of the impurity throughout the thickness of the deposited silicon layer is less than about 4 percent.

As a matter of course the invention is not restricted to the Examples described above.

In the manufacture of semiconductor devices both epitaxial and polycrystalline layers may be deposited. Apart from semiconductor material compounds of semiconductor materials, for example, silicon nitride may be deposited. The substrates thus treated can be worked up in a conventional manner often into many semiconductor devices in each substrate.

Etching processes on substrates may also be carried out in the manner described above.

What is claimed is:

1. A method of manufacturing a semiconductor device in which a process is used which involves a gas stream and at least one heated substrate, in a horizontally disposed tubular reactor of substantially rectangular cross-section, substantially constant transverse dimension, substantially planar bottom, of decreasing vertical dimension in the direction of stream flow, and open at each end, characterized in that the relation:

$$1.10^{-8} < (V_o \tan^2\phi)/(T_s T_M b^{0.5} D_o^{1.5}) < 100.10^{-8}$$

is satisfied, wherein $V_o$ is the rate of the gas stream in cms/sec at normal temperature and pressure at the inlet of the tube portion where the process takes place, $\phi$ is the angle defining the reactor tube's top and bottom walls extended, $T_s$ is the temperature of the substrate in degrees K, $T_m$ is the temperature of the gas in the tube portion for the performance of the process in degrees K, $b$ is the distance between the susceptor and the top surface of the reactor at the inlet of the tube portion for the performance of the process in cms and $D_o$ is the diffusion coefficient in sq.cms/sec of the compound in the gas stream which determines the rate of the process.

2. A method as claimed in claim 1 characterized in that the relation:

$$3.10^{-7} < V_o \tan^2\phi / T_s T_M b^{0.5} D_o^{1.5} < 7.10^{-7}$$

is satisfied.

3. A method as claimed in claim 1 characterized in that during the deposition the substrates are continuously displaced through the tubes.

* * * * *